United States Patent
Zhou

(10) Patent No.: US 12,485,364 B2
(45) Date of Patent: Dec. 2, 2025

(54) MULTI-MODAL ION-EXCHANGE MEMBRANES FOR RAPID SEPARATIONS

(71) Applicant: CLEMSON UNIVERSITY, Clemson, SC (US)

(72) Inventor: Jinxiang Zhou, Clemson, SC (US)

(73) Assignee: CLEMSON UNIVERSITY RESEARCH FOUNDATION, Clemson, SC (US)

( * ) Notice: Subject to any disclaimer, the term of this patent is extended or adjusted under 35 U.S.C. 154(b) by 1197 days.

(21) Appl. No.: 16/100,319

(22) Filed: Aug. 10, 2018

(65) Prior Publication Data
US 2020/0047086 A1   Feb. 13, 2020

(51) Int. Cl.
| | |
|---|---|
| B01D 15/38 | (2006.01) |
| B01D 15/36 | (2006.01) |
| B01J 20/28 | (2006.01) |
| B01J 20/32 | (2006.01) |
| B01J 39/26 | (2006.01) |
| B01J 47/014 | (2017.01) |
| B01J 47/02 | (2017.01) |
| C07K 1/18 | (2006.01) |

(52) U.S. Cl.
CPC ......... B01D 15/3847 (2013.01); B01D 15/36 (2013.01); B01J 20/28033 (2013.01); B01J 20/327 (2013.01); B01J 20/3278 (2013.01); B01J 20/3285 (2013.01); B01J 39/26 (2013.01); B01J 47/014 (2017.01); B01J 47/02 (2013.01); C07K 1/18 (2013.01)

(58) Field of Classification Search
None
See application file for complete search history.

(56) References Cited

U.S. PATENT DOCUMENTS

| | | | |
|---|---|---|---|
| 5,739,316 A | 4/1998 | Beer et al. |
| 7,311,825 B2 | 12/2007 | Shah |
| 7,320,754 B2 | 1/2008 | Carlsson et al. |
| 8,002,830 B2 | 8/2011 | Boyan et al. |
| 8,206,958 B2 | 6/2012 | Childs et al. |
| 8,211,682 B2 | 7/2012 | Childs et al. |
| 8,277,649 B2 | 10/2012 | Malenfant et al. |
| 8,298,657 B2 | 10/2012 | Bonner et al. |
| 8,313,651 B2 | 11/2012 | Childs et al. |
| 8,652,849 B2 | 2/2014 | Childs et al. |
| 8,703,831 B2 | 4/2014 | Liu et al. |
| 8,758,954 B2 | 6/2014 | Van Baak et al. |
| 8,945,896 B2 | 2/2015 | Rasmussen et al. |
| 8,968,963 B2 | 3/2015 | Van Berchum et al. |

(Continued)

OTHER PUBLICATIONS

US 9,403,701 B2, 08/2016, Lin (withdrawn)

*Primary Examiner* — Kara M Peo
(74) *Attorney, Agent, or Firm* — DORITY & MANNING, P.A.

(57) ABSTRACT

Ion exchange membranes (e.g., anion exchange membranes) and methods of using the membranes are described. The ion exchange membranes are multi-modal ion exchange membranes containing a plurality of multi-modal exchange ligands. The membranes can achieve high dynamic and equilibrium binding capacities at solution conductivities typical for production of biologics (e.g., greater than about 10 mS/cm) and can provide excellent binding at high flow rates. Systems incorporating the membranes can dramatically increase isolation and purification speeds. Membranes are disclosed for use in production of biologics.

19 Claims, 5 Drawing Sheets

(56) References Cited

U.S. PATENT DOCUMENTS

| | | |
|---|---|---|
| 8,974,578 B2 | 3/2015 | Kanatzidis et al. |
| 9,023,902 B2 | 5/2015 | Husson et al. |
| 9,033,159 B1 | 5/2015 | Husson et al. |
| 9,295,928 B2 | 3/2016 | Dileo et al. |
| 9,314,746 B2 | 4/2016 | Waller et al. |
| 9,375,499 B2 | 6/2016 | Etzel |
| 9,428,544 B2 | 8/2016 | Sato et al. |
| 9,433,922 B2 | 9/2016 | Kozlov et al. |
| 9,468,923 B2 | 10/2016 | Kanatzidis et al. |
| 9,540,261 B2 | 1/2017 | Lin |
| 9,611,368 B2 | 4/2017 | Lin |
| 9,636,642 B2 | 5/2017 | Yin |
| 9,650,470 B2 | 5/2017 | Bothof et al. |
| 9,758,547 B2 | 9/2017 | Rasmussen et al. |
| 9,768,502 B2 | 9/2017 | Lin |
| 2009/0277838 A1 | 11/2009 | Liu et al. |
| 2012/0064601 A1 | 3/2012 | Komkova et al. |
| 2012/0298582 A1 | 11/2012 | Kanani et al. |
| 2013/0056415 A1 | 3/2013 | Kozlov et al. |
| 2013/0317129 A1 | 11/2013 | Koguma et al. |
| 2014/0238935 A1 | 8/2014 | Komkova et al. |
| 2014/0273158 A1 | 9/2014 | Ragheb |
| 2018/0191013 A1 | 7/2018 | Frank et al. |
| 2018/0200708 A1 | 7/2018 | Hessing et al. |
| 2018/0201746 A1 | 7/2018 | Hessing et al. |

MULTI-MODAL ION-EXCHANGE MEMBRANES FOR RAPID SEPARATIONS

FEDERAL RESEARCH STATEMENT

This invention was made with government support under Grant Number 1 R43 GM117685-01 awarded by National Institutes of Health. The government has certain rights in the invention.

BACKGROUND

Biologics are pharmaceutical drug products manufactured in, extracted from, or synthesized from biological sources. Biologics are in high demand to treat chronic diseases such as cancers, cardiovascular diseases, autoimmune disorders, and many orphan diseases. Campaigns are underway to further develop biologics, with thousands of biologics currently in the pipeline. Despite their tremendous potential for improving human health, biologics are among the most expensive drugs to develop, with annual costs per patient reaching $60,000 for some cancer biologics.

Adding to basic R&D cost issues, the biopharmaceutical industry as a whole is transitioning from large, single-product facilities to scalable, multi-product facilities. Growing competition and emerging markets, such as personalized medicine, battlefield medicine, orphan drugs, etc., have increased demand for small batch production runs. In addition, the industry has realized that implementation of fast, small batch production is an effective strategy to reduce market uncertainty as the competition increases. Unfortunately, costs for small-batch production of biologics can be 10 times higher than biologics produced in large scale.

Due to such cost issues many biologics known to be beneficial to patient health are simply not economically viable. Clearly, a key challenge in the industry is to translate biologics from research labs to FDA approved medications and commercial production more efficiently and economically.

One of the primary limitations to increasing biomanufacturing productivity is downstream product purification. Ion-exchange chromatography is used widely in the biopharmaceutical industry for downstream processing of biologics at multiple stages including capture, intermediate purification, and polishing purification. Traditional practice utilizes large columns containing charged functional groups attached to a solid resin matrix either in "flow through" mode to remove impurities or "bind-and-elute" mode to capture targets from cell culture supernatant. The functional groups can be charged positively (anion exchangers) or negatively (cation exchangers) and interact with charged molecules primarily via Coulombic interactions. While effective and reliable, traditional ion-exchange chromatography has low mass throughput and low efficiency, leading to long processing times that cause product degradation, with product losses as high as 50%. Moreover, typical large footprint column operations exhibit high pressure drop and complex scale-up criteria leading to low flexibility, and it is estimated that traditional chromatography unit operations contribute about 30-40% of the overall manufacturing cost of biologics. Such limitations, combined with tremendous pressure from global competition and government regulations, are forcing the biopharmaceutical industry to look for alternatives to traditional resin column chromatography.

Improvements have been made to traditional systems such as the development of disposable, prepacked resin chromatography column products. These products can reduce capital investment and eliminate column packing, cleaning, and validation steps. Unfortunately, these products are not addressing key resin chromatography issues including the slow purification speed leading to low productivity.

Membrane chromatography has been promoted as a promising alternative to conventional resin chromatography. Membrane chromatography addresses many existing issues as it provides short residence times and small footprints. For instance, single-use, disposable membrane chromatography column products enable fast processing speeds and high productivity. However, current products have low capacities for biological impurities such as host cell proteins, aggregates, virus particles, endotoxins, and DNA. Moreover, the efficiency of contaminant removal is heavily compromised under conditions often found in downstream process streams. For instance, membrane systems often lose binding capacity at solution conductivities greater than 10 mS/cm, which is a common condition used during biologics production. For single-use columns, low binding capacity translates to larger membrane volume requirements and added cost. With high titer cell line technology expected to dominate the industry in the future, low capacity membrane columns will fail to address purification needs.

What are needed in the art are chromatography systems that have a high capacity for processing biologic products (e.g., removing product impurities) under conditions of typical high solution conductivity and with fast processing speeds (i.e., short residence times). Systems that can rapidly and efficiently purify biologics could greatly decrease the production costs and provide efficient removal of impurities, such as product-related impurities and aggregates that can cause fatal immune reactions, and would be of great benefit.

SUMMARY

According to one embodiment, a method for forming a multi-modal ion exchange membrane is disclosed. A method can include grafting a polymer at a surface of a porous substrate (e.g., a membrane substrate). For instance, a polymer can be grafted at a surface according to either a 'grafting from' approach or according to a 'grafting to' approach. A method can also include binding a functional ligand to the polymer. The functional ligand can provide multiple modes of sorptive functionality to the membrane, and at least one of the modes can be ionic functionality. For instance, upon the functionalization of the polymer, each ligand can provide cationic functionality as well as a secondary sorptive functionality, e.g., hydrophobic functionality.

Also disclosed are multi-modal ion exchange membranes as may be formed according to the method. For instance, a multi-modal ion exchange membrane can include a porous, self-supporting membrane substrate and a plurality of polymers grafted at a surface of the substrate. In addition, the ion exchange membrane can include a plurality of ligands on each polymer; each ligand providing multiple modes of sorptive functionality. For instance, the ion exchange membrane can include a plurality of ligands pendant to each of the polymers, and each ligand can provide ionic functionality (e.g., cationic functionality in the embodiment of an anion exchange membrane) in addition to a second sorptive functionality, e.g., hydrophobic, hydrophilic, ionic, thiophilic, hydrogen bond donating, hydrogen bond accepting, pi-pi bond donating, pi-pi bond accepting, metal chelating, or some combination thereof.

Also disclosed are separation processes that can be carried out by use of the ion exchange membranes. For instance, a process can include contacting a multi-modal ion exchange membrane with a solution comprising one or more targeted biological components. In one embodiment, the solution can exhibit a high solution conductivity, for instance from about 0.5 mS/cm to about 50 mS/cm, or from about 8 mS/cm to about 30 mS/cm in some embodiments. For instance in one embodiment, the solution can include a high concentration of phosphate anions, e.g., about 10 millimolar (mM) or greater. The process can separate the targeted biological component(s) from the solution with high binding capacities (dynamic binding capacity and/or equilibrium binding capacity), for instance with binding capacities of about 150 milligrams per milliliter (mg/mL) or greater of proteinaceous targets and/or about 8 mg/mL or greater of polynucleotide targets (e.g., DNA or RNA). Moreover, the process can be carried out at high flow rates and low residence times for the solutions, such as about 10 column volumes (CVs)/min or greater flow rates and about 6 seconds or shorter residence time.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Figure 1:
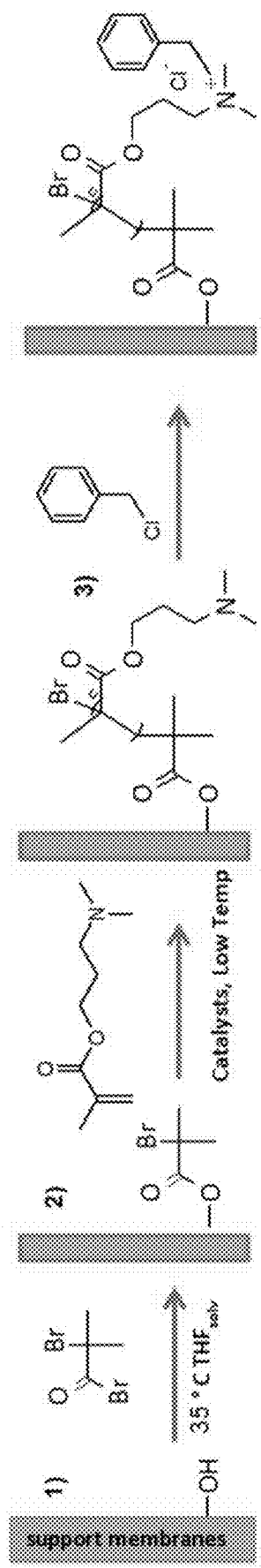
FIG. 1 schematically illustrates one embodiment of a membrane synthesis route.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are ion exchange membranes, methods of forming the ion exchange membranes, and methods of using the membranes. The ion exchange membranes are multi-modal ion exchange membranes containing a plurality of multi-modal exchange ligands. Beneficially, disclosed membranes can achieve high dynamic and equilibrium binding capacities. For instance, the membranes can achieve high biologic dynamic binding capacity with very short residence times and high impurity clearance. In addition, the membranes can achieve high binding capacities at solution conductivities typical for production of biologics (e.g., greater than about 10 mS/cm) and, in the case of dynamic binding capacity, can do so at high flow rates and low residence time. For instance, the membranes can in some embodiments provide double the protein dynamic binding capacity of commercial membrane products and can do so at half the typical residence time. Systems incorporating disclosed membranes can dramatically increase isolation and purification speeds, which can decrease product loss and improve economic viability of production, and in particular of biologics production, which is needed to move biologics from discovery to market.

The membranes include a porous membrane substrate and polymers grafted at surfaces of the substrate. In addition, the grafted polymers carry functional ligands that provide multi-modal ion-exchange functionality to the membranes. The membranes can be single use membranes or disposable membranes that can be used in the separation and/or purification of biomolecules such as proteins, peptides, nucleic acids, virus or virus-like particles (i.e., structures of about 30 nm to about 90 nm that result from the self-assembly of virus proteins without a nucleic acid genome or a lipid envelope), endotoxins, and the like as well as combinations of biomolecules according to adsorptive downstream bioseparation unit operations.

In one embodiment the porous membrane substrate can be a self-supporting membrane (i.e., not requiring a backing material). In one embodiment, the membrane can be formed of a hydrophilic material. For example, the porous membrane can be formed from cellulose, cellulose derivatives, regenerated cellulose, nylon, or other hydrophilic membrane materials. However, it is to be understood that the use of a hydrophilic material is not required, and the porous membrane substrate can be formed from other materials known to those of ordinary skill in the art, such as polysulfone, polyethersulfone, polyvinylidene fluoride, polyacrylonitrile, polyetherimide, polypropylene, polyethylene, or polyether terephthalate. Porous membranes as can be utilized herein encompass porous hydrogel membranes as well as fibrous membranes, e.g., porous membranes formed of nanofibers such as electrospun nanofibers.

The porous membrane substrate can be a macroporous membrane. Macroporous membrane substrates can be used in one embodiment and can exhibit high volumetric flow rate due to micron-size pores, low non-specific adsorption of proteins, and high density of surface functionality that can be used as reactive sites.

As utilized herein, the term "macroporous" generally refers an interconnected pore network in which the average cross-sectional dimension of the pores is about 0.5 micrometers (μm) or greater, or about 1 μm or greater in some embodiments. (As utilized herein, the term "about" generally refers to ±10% of the stated value.) However, a macroporous membrane substrate is not a requirement of the disclosed systems and materials, and smaller pore sizes may be utilized in some embodiments. In general, absolute pore size of a porous membrane substrate can range from about 0.01 μm to about 50 μm. For instance, the absolute pore size can range from about 0.05 μm to about 15 μm, such as from about 0.10 μm to about 10 μm in some embodiments. In one embodiment, a porous membrane substrate can have an absolute pore size from about 0.2 μm to about 5.0 μm, for instance about 0.45 μm to about 4.5 μm or about 1.0 μm to about 3.0 μm in some embodiments. As utilized herein, the term "absolute pore size" refers to the pore size at which a challenge organism or particle of a particular size will be blocked by the material with nearly complete efficiency (e.g., greater than about 99.8%).

The selection of polymer to be grafted at the porous membrane substrate as carrier for the multi-modal exchange functionality can be based on the presence of functionality available in the molecular structure of the monomers used to form the polymers (for polymerization as well as for ligand binding), as well as the presence of functionality available on the surface of the membrane substrate (to bind the polymers at the surface). Moreover, such functionality can be inherent to the monomers and/or the substrate or can be added prior to grafting of the polymers at the membrane substrate. For instance, a membrane surface can be pretreated, e.g., through use of corona plasma, chemical functionalization or the like, to establish a desired reactive functionality for polymer grafting at surfaces of the membrane.

In one embodiment, monomers can include functionality to form the polymer as well as functionality that can be used to provide binding sites for the multi-modal ligands. As such, following polymerization, a second step can be carried out during which one (or more) ligands are added to the polymers, with the addition of the ligands providing the multi-modal sorptive functionality to the membrane. In this embodiment no intervening processing step is necessary to provide binding sites for the ligands on the polymers. Of course, this is not a requirement, and in other embodiments, following polymerization, the grafted polymers can be further processed (e.g., to form a particular reactivity on the polymers) prior to reaction with ligands that then provide the multi-modal sorptive functionality. Moreover, in those embodiments in which the polymer includes functionality, a polymer can include multiple different types of functional groups.

Examples of monomers that can be used in forming the grafted polymers can include, without limitation, styrene, acrylate, methacrylate, acrylamide, or acrylonitrile based-monomers, or combinations thereof. In one embodiment, the polymer can be formed via polymerization of dimethylaminoethyl methacrylate monomer, (diethylamino) ethyl methacrylate monomer, (dimethylamino) ethyl acrylate monomer, or (diisopropylamino) ethyl methacrylate monomer, hydroxyethyl acrylate monomer, hydroxyethyl methacrylate monomer, poly(ethylene glycol) methacrylate monomer, or combinations thereof.

A polymer can be grafted at a surface of the membrane substrate according to either a 'grafting to' process or a 'grafting from' process. In 'grafting from' embodiments, the polymer chain can be formed by polymerizing a plurality of monomers to form the polymer extending from the surface of the membrane. This polymerization results in the polymer chain being covalently bonded to the surface of the membrane, for instance via an anchoring compound. Thus, the 'grafting-from' method involves formation of the polymer chain onto the membrane and results in the polymer chain being covalently bonded to the membrane and including a functionality for use in addition of the multi-modal ligands to the polymers.

Alternatively, in 'grafting to' embodiments, the polymeric chain can be first polymerized and subsequently covalently bonded to the surface of the membrane, either directly or via an anchoring compound. Thus, in this embodiment, the polymeric chain has been polymerized prior to attachment to the membrane. Similarly to the 'grafting from' embodiment, the polymeric chain upon attachment to the membrane surface can include functionality for use in addition of the multi-modal ligands to the polymers.

The polymer density at a membrane surface as well as polymer length (molecular weight) can depend upon synthesis conditions including, without limitation, initiator formulation, polymerization formulation, temperature, reaction time, etc. Such conditions can be adjusted to provide a desired polymer chain density at the surface and polymer length (in the case of a 'grafting from' protocol). Membrane selection can also affect polymer density. For instance, in addition to increasing flow characteristics during separation protocols, larger pore sized membranes have lower surface area per unit volume, and as such the number of grafted polymers (and multi-modal ligands) can be lower at a constant chain density as compared to a smaller pore membrane.

In one embodiment, surface-initiated graft polymerization can be utilized to provide the polymers at a surface of a porous membrane substrate according to a 'grafting from' approach. One example of such an embodiment is illustrated in FIG. 1. As shown, this 'grafting from' approach can include a two-step surface modification process to provide the polymers at the membrane surface. In the first step, membranes can be functionalized with an initiator, e.g., an atom transfer radical polymerization (ATRP) initiator, and in the second step, initiator-functionalized membranes can be further modified to include a polymer according to surface-initiated activator regenerated electron transfer (ARGET)-ATRP or activator generated electron transfer (AGET)-ATRP methods utilizing the desired monomer(s).

By way of example, a typical initiator functionalization solution can include an ATRP initiator precursor, one or more solvents, and optionally, a catalyst. Suitable ATRP initiator precursors can include organic halides such as bromine or chlorine. For example, the ATRP initiator precursor can be 2-bromoisobutyryl bromide (2-BIB) as illustrated in FIG. 1. Common solvents can include but are not limited to tetrahydrofuran, toluene, acetonitrile, and mixtures of one or more of these solvents. The concentration of the ATRP initiator precursor in the solution can range from about 1 millimolar (mM) to about 300 mM, such as from about 10 mM to about 250 mM, from about 20 mM to 150 mM, from about 50 mM to about 100 mM in other embodiments, from about 70 mM to about 90 mM, or about 80 mM in some embodiments. The initiator functionalization can be carried out a temperature ranging from about 0° C. to about 90° C., such as at a temperature of about 45° C.

A polymerization solution can include a monomer, a catalyst including a metal salt and complexing ligand, a solvent, and a reducing agent. Examples of monomers that can be used include styrene, acrylate, methacrylate, acrylamide, or acrylonitrile based-monomers. For example, the monomer can be dimethylaminoethyl methacrylate (DMAEMA) as illustrated in FIG. 1.

The metal salt can be a transition metal salt such as copper, titanium, molybdenum, rhenium, iron, ruthenium, osmium, rhodium, cobalt, nickel, or palladium. One example of a suitable metal salt is copper(II) chloride. Methanol, ethanol, 2-propanol, water and mixtures of one or more solvents can be used, but it should be understood that other suitable solvents can also or alternatively be used.

A complexing ligand can be included that can coordinate with the metal salt and improve solubility as well as adjust the oxidation/reduction potential of the metal salt through formation of a coordination complex. Examples of suitable complexing ligands include, without limitation, 2,2'-bipyridine, N,N, N', N',N''-pentamethyldiethylenentriamine, 1,1,4,7,10,10-hexamethyltriethylenetetramine, tris(2-dimethylaminoethyl)amine, and combinations thereof.

The molar ratio of monomer to catalyst can be varied as is known. For instance, the molar ratio of monomer to catalyst can be from about 200:3 to about 400:3 in some embodiments.

Ascorbic acid is one suitable reducing agent, but others can alternatively be used. For instance, other suitable reducing agents include triethylamine (TEA), tin(II) 2-ethylhexanoate, glucose, buffer salts, and hydrazine, as well as combinations thereof. The monomer and/or the complexing ligand can also serve as a reducing agent (e.g., when polymerizing according to a standard ATRP protocol). The monomer can be added to the solvent, and the concentration of the monomer in the solvent can range from about 0.05 molar (M) to about 5 M in some embodiments, such as from about 0.5 M to about 4 M, and from about 1 M to about 3 M in still other embodiments.

The concentration of the metal salt in the solution can generally range from about 5 parts per million (ppm) to about 400 ppm, such as from about 10 ppm to about 350 ppm in some embodiments and from about 25 ppm to about 250 ppm in still other embodiments. For instance, the concentration of the metal salt in the solution can range from about 0.01 mM to about 0.8 mM, such as from about 0.02 mM to about 0.6 mM in some embodiments and from about 0.05 mM to about 0.5 mM in still other embodiments.

The reducing agent can be added in an amount so that the molar ratio of reducing agent to transition metal salt can typically range from about 0 to about 100, such as from about 0 to about 40 in some embodiments, and from about 0.5 to 20 in still other embodiments. For example, the reducing agent can be added in an amount of from about 0 mM to about 8 mM, such as from about 0.25 mM to about 6 mM in some embodiments and from about 0.5 mM to 4 mM in still other embodiments.

A surface-initiated ATRP process such as an ARGET or AGET-ATRP process can generally be carried out a temperature ranging from about 0° C. to about 80° C., for instance, at a temperature ranging from about 20° C. to about 60° C. or about 40° C. in some embodiments.

In one embodiment, a surface initiated grafting process can be carried out in the presence of dissolved oxygen and very low catalyst concentration. The addition of an oxygen scavenger (e.g., ascorbic acid) can be beneficial for removing dissolved oxygen from the polymerization solution.

Surface-initiated polymerization (e.g., (ARGET)-ATRP or (AGET)-ATRP) can allow independent control over polymer chain grafting density as well as the chain length of the polymers grafted from the membrane surfaces (e.g., membrane pore surfaces). By controlling polymer length and polymer chain grafting density independently, the protein binding capacity and transport properties of membranes can be optimized.

Following grafting of the polymers at the membrane substrate surface, the polymers can include functionality (or can be processed to include functionality) for further reaction with ligands to provide a plurality of ligands along each polymer chain, each ligand providing multiple modes (at least two) of sorptive interaction, with at least one of the modes being ionic. For instance, in the embodiment illustrated in FIG. 1, the grafted polymers include a tertiary amine functionality that can be utilized for further derivatization of the polymers and formation of the multi-modal sorptive functionalities.

These ligands are selected such that upon covalent binding of the ligand to the polymer the bonded ligand provides multiple modes of interaction between the functionalized membranes and targeted species in a separation protocol. The multiple modes can include any combination of sorptive functionalities (i.e., sorptive interaction capabilities) that can provide or improve the separation characteristics of the membranes. By way of example and without limitation, the interaction modes can include ionic, hydrophobic, hydrophilic, thiophilic, hydrogen bond donating, hydrogen bond accepting, pi-pi bond donating, pi-pi bond accepting, or metal chelating mode, as well as combinations thereof.

In one embodiment, the ion exchange membranes can be anion exchange membranes, in which case at least one of the sorptive modes can be cationic. In this embodiment, secondary modes of separation interaction can be selected depending upon the specific separation protocol to be carried out by the membranes.

The sorptive modes can pre-exist on the ligands or can be formed upon reaction of the ligands with the polymer. By way of example, reaction between a ligand and a reactive group on a polymer (e.g., an amine group) can form a cationic fixed charge at the ligand (e.g., a quaternary amine) as well as a provide a hydrophobic aryl group as a second interactive mode, as illustrated in the embodiment of FIG. 1.

In one embodiment, a ligand can have the following structure:

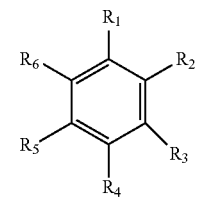

In which $R_1$ is selected from halogen; hydroxyl; amine; C1 to C6 alkyl, alkyl halide, alkoxy, alcohol, carboxylic acid, sulfonic acid, phosphonic acid, amine, or combinations thereof (e.g., aminoalkylphosphonic acid); and $R_2$ through $R_6$ are independently selected from hydrogen; halogen; hydroxyl; amine; C1 to C6 alkyl, alkyl halide, alkoxy, alcohol, carboxylic acid, sulfonic acid, phosphonic acid, amine, or combinations thereof; and optionally substituted with conjugated and/or non-conjugated rings, including heterocyclic rings and fused ring systems, and can include rings derivatized with one or more of hydrogen, halogen, or alkoxy.

In one embodiment, $R_1$ and $R_2$ can be fused, for instance having the structure $R_1-C_nH_{2n}-R_2$, n=1-10, in which $R_1$ can be selected from alkyl halide, alkoxy, alcohol, carboxylic acid, sulfonic acid, phosphonic acid, or amine and $R_2$ can be independently selected from hydrogen; halogen; hydroxyl, alcohol, carboxylic acids, sulfonic acids, phosphonic acids, or amine.

In one embodiment, heterocyclic rings of a ligand can include substitutes such as, without limitation, halide, alkoxy, alcohol, carboxylic acid, sulfonic acid, phosphonic acid, or amine, optionally substituted with conjugated and/or non-conjugated rings, including heterocyclic rings and fused ring systems; conjugated or non-conjugated rings, including heterocyclic rings and fused ring systems and can include rings reprivatized with one or more of hydrogen, halogen or alkoxy.

The ligands can react with existing functionality of a polymer to graft the ligands to the polymer. For example, in the embodiment illustrated in FIG. 1, the tertiary amine groups of poly(DMAEMA) provide sites to incorporate benzyl chloride as the multi-modal ligand. An amine quaternization step (FIG. 1) yields a multi-modal ligand comprising a strong anion exchange site and the aromatic group to promote hydrophobic interactions.

The ligands can be bonded to the polymer according to any suitable reaction scheme. For instance, a step of ligand incorporation on a polymer can be carried through contact of a solution including the ligand at a suitable temperature. For instance, a solution can incorporate the ligand at a concentration of from about 1 mM to about 300 mM, such as from about 10 mM to about 250 mM, from about 20 mM to 150 mM, from about 50 mM to about 100 mM in other embodiments, from about 70 mM to about 90 mM, or about 80 mM in some embodiments. The reaction can take place at a temperature ranging from about 0° C. to about 80° C., for instance, at a temperature ranging from about 40° C. to about 60° C. in some embodiments and reaction time can vary, for instance from about 1 minute to about 40 hours.

A membrane can incorporate the multi-modal ligands at a high density, which can provide for improved separation rates and high binding capacity of the membranes. For example, the multi-modal ligands can be incorporated on the membranes at a ligand density of from about 50 micromolar per milliliter (μM/ml) to about 1000 μM/ml, for instance from about 500 μM/ml to about 700 μM/ml in some embodiments. Moreover, not all of the sorptive modes of a membrane need be provided by the multi-modal ligands. For instance, in the embodiment illustrated in FIG. 1, a portion of the tertiary amine of the polymer can remain as another mode of interaction. For example, about 50% or more of the sorptive modes can be provided as components of multi-modal ligands (e.g., about 50% to about 70% of the total sorptive modes), while the remaining modes can be provided as single mode ligands (e.g., the remaining tertiary amines of the polymer).

Ion-exchange membranes prepared according to disclosed methods can have extremely high and fully reversible dynamic and equilibrium protein binding capacities. For instance, a column can have a binding capacity in excess of about 150 mg/mL for proteins, such as from about 10 mg/mL to about 250 mg/mL in some embodiments and from about 25 mg/mL to about 150 mg/mL in still other embodiments. They can also provide extremely high and fully reversible polynucleotide binding capacities from about 1 mg/mL to about 50 mg DNA/mL, for instance from about 1 mg/mL to about 25 mg/mL, or to about 10 mg/mL in some embodiments. In addition, the membranes can remove aggregates and isoforms of biological compounds from solutions, which can be highly beneficial in biologics purification methodologies. As utilized herein, the term "isoforms of biological compounds" generally refers to members of a set of highly similar proteins that originate from a single gene or gene family and are the result of genetic differences.

The multi-modal membranes can be utilized in any type of ion exchange system as is known including both batch and continuous separation protocols. Columns as can incorporate the membranes can include, without limitation, syringe filter columns, spin columns, cassettes and spiral-wound membrane columns as are generally known. In one particular embodiment, the multi-modal membranes can be utilized in single-use separation columns and can be used in the separation and purification of charged molecules such as proteins, nucleic acids, virus or virus like particles, endotoxins, and the like.

A column volume can be designed as desired and usually depends upon the specific application for the ion exchange device. As is known, the column volume can be optimized for efficient separation of the targeted materials. Columns incorporating disclosed membranes can be small volume, for instance as are commonly utilized in small-scale separations or can be large volume, for use in large scale separations. Small scale column volumes can be, for example about 1 ml or less, for instance about 0.5 mL, or about 0.1 mL or less in some embodiments. However, large scale column volumes up to about 100 liters are also encompassed herein, e.g., from about 1 mL to about 50 L, or from about 1 L to about 10 L, in some embodiments.

The membranes can provide high binding capacities at high solution conductivities and high flow rates through columns incorporating the membranes. For instance, the membranes can provide binding capacities as described even for solutions having conductivities of up to about 30 mS/cm, for instance from about 5 mS/cm to about 25 mS/cm, from about 8 mS/cm to about 15 mS/cm or about 10 mS/cm in some embodiments. For instance, the membranes can provide high binding capacities when utilized with solutions having a relatively high concentration of ions, e.g., a phosphate anion concentration of about 10 mM or higher, in some embodiments. High dynamic binding capacities are attainable at low residence times of about 6 s residence time or less, e.g., about 3 s or less about 1 s or less or about 0.5 s or less in some embodiments; and at high flow rates, e.g., about 10 CVs/minute or greater, for instance about 15 CVs or greater). For perspective, a residence time of 3 s is 120 times lower than that of conventional resin products and 2 times lower than that of current standard membrane technology. By way of example, under conditions of 13 mS/cm conductivity in tris-base buffer, a multi-modal anion-exchange membrane as described can exhibit more than twice the binding capacity of previously known ion exchange membranes. In 1×PBS buffer, disclosed membranes can exhibit more than 14 times higher dynamic protein binding capacity, and more than 6 times higher dynamic DNA binding capacity as compared to previously known salt tolerant ion exchange membranes.

Disclosed membranes can be used in production of biologics in one embodiment. For instance, in one embodiment, a single-use multi-modal anion exchange membrane column can be used for polishing step purification in a three-step process that includes an affinity separation (e.g., Protein A or Protein G separation), a cation exchange separation, and a final polishing step separation in which the final polishing step uses a column incorporating a multi-modal membrane as described. With high capacity for removing impurities such as host cell proteins, DNA, virus particles and aggregates under conditions of high solution conductivity, columns incorporating disclosed membranes can enable polishing step purification without buffer exchange or dilution steps, thus saving time and simplifying the purification process. By selectively removing aggregates, multi-modal membrane columns can avoid the need for additional chromatography steps (e.g., hydrophobic interaction chromatography).

Columns incorporating the disclosed membranes can also be utilized in two-step purifications, for instance a purification process that includes a first capture step separation followed by a multi-modal ion exchange separation utilizing disclosed membranes as well as utilizing a multi-modal ion exchange separation utilizing disclosed membranes prior to a capture step separation. Two-step purification processes can offer robust, rapid removal of process impurities over a range of pH-conductivity values. Elimination of a third purification step could also reduce purification time and cost.

In some embodiments, the disclosed membranes can be used for capture step purification. Protein A affinity chromatography is the platform capture step technology for monoclonal antibody purification, but there are many examples of biologics that cannot be purified using Protein A affinity chromatography due to lack of Fc binding domain, and problems with aggregation during low pH elution from the Protein A column. Accordingly, disclosed membranes may be beneficially utilized in capture step purification of such biologics. Analogously, for some applications columns incorporating disclosed membranes can be placed downstream of a cation exchange column with no need for an affinity capture column preceding it.

The present disclosure may be better understood with reference to the Examples, provided below.

Example 1

Multi-modal membranes were synthesized as illustrated in the reaction scheme of FIG. 1. Regenerated cellulose (RC) macroporous membranes (1 μm nominal pore diameter, 160 μm thickness) were used as the base membrane substrate. Hydroxyl groups on the substrate membrane were used for initiator attachment (FIG. 1, step 1). 2-Dimethylaminoethyl methacrylate (DMAEMA) was used as the monomer for polymer chain grafting (FIG. 1, step 2). The tertiary amine groups of poly(DMAEMA) provided reaction sites to incorporate benzyl chloride as the multi-modal ligand.

To attach the benzyl chloride ligands, a polymer grafted membrane was soaked in benzyl chloride/acetonitrile solution (87 mM benzyl chloride) at a temperature of 40° C. for a period of 12 hours. This step (FIG. 1, step 3) yielded the multi-modal ligand comprising a strong cationic anion exchange site and aromatic groups to promote hydrophobic interactions.

Figure 2:
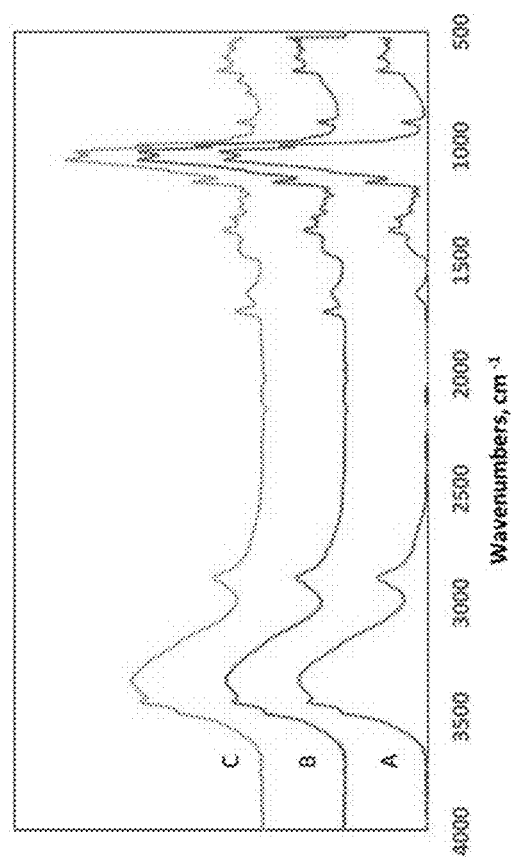
FIG. 2 presents attenuated total reflectance-Fourier-transform infrared (ATR-FTIR) spectra of a membrane substrate (A), polymer modified membrane (B), and multi-modal membrane (C).

Surface chemistry properties of the membranes were analyzed by attenuated total reflectance-Fourier-transform infrared (ATR-FTIR) spectroscopy to support successful membrane surface modification. FIG. 2 presents ATR-FTIR spectra of unmodified base substrate membrane (spectrum A), poly(DMAEMA)-modified membrane (spectrum B), and multi-modal membrane (spectrum C). Compared with spectrum A, spectra B and C have significant absorbance peaks around 1730 cm$^{-1}$ that is assigned to stretching of carbonyl groups in poly(DMAEMA). This peak indicates successful surface-initiated polymer modification. In spectrum C, peaks around 715 cm$^{-1}$ and 770 cm$^{-1}$ are assigned to C—H bending from mono-substituted aromatic rings. These peaks indicate successful ligand incorporation.

Figure 3A:
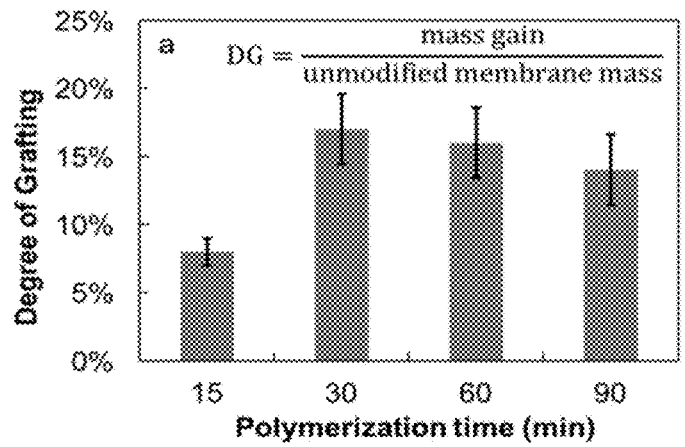
FIG. 3A presents the impact of polymerization time on degree of grafting of polymers in formation of disclosed membranes.
Figure 3B:
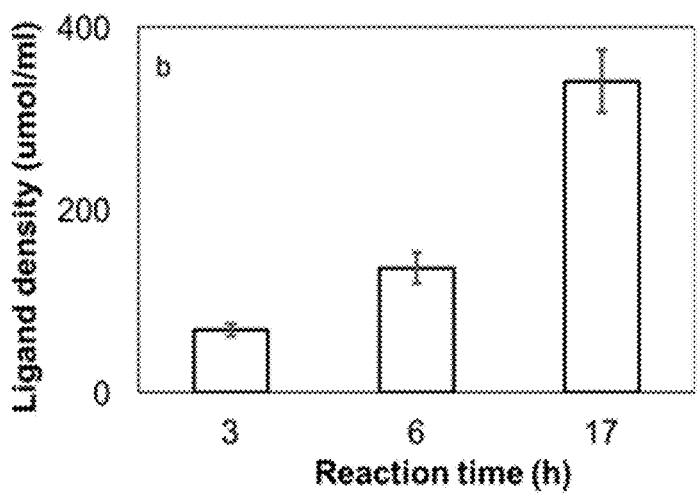
FIG. 3B presents the impact of reaction time on incorporated ligand density in formation of disclosed membranes.
Figure 3C:
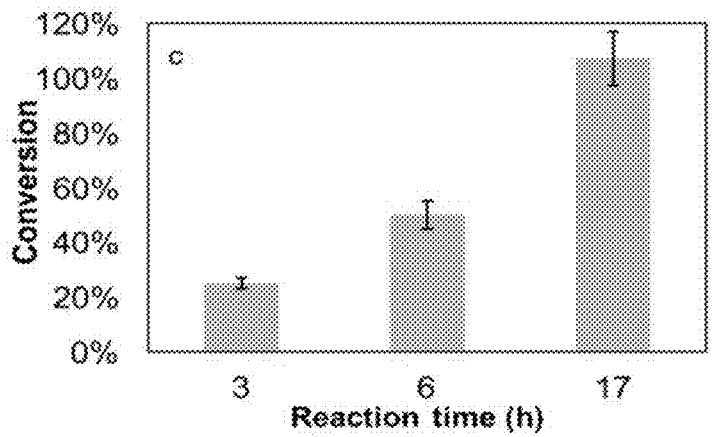
FIG. 3C presents the conversion of tertiary amine groups to multi-modal ligands with reaction time in formation of disclosed membranes.

FIG. 3A-FIG. 3C quantify the degree of surface modification of the membrane. FIG. 3A shows that significant mass gain (reported as degree of grafting) was observed after polymer grafting. Here and in all figures, error bars represent one standard deviation among at least three measurements unless stated otherwise. In this set of experiments, membranes were polymerized in 30:70 (v/v) methanol/water solvent with formulation [DMAEMA]:[Catalyst]:[Ligand]:[Reducing Agent]=600:3:9:10. The formulation reacted efficiently at room temperature. After 30 minutes, the degree of grafting plateaued at 17%±3%. FIG. 3B shows how ligand density increased as benzyl chloride groups were incorporated onto the poly(DMAEMA) membranes with 30 min polymerization (FIG. 1, step 3).

Figure 4:
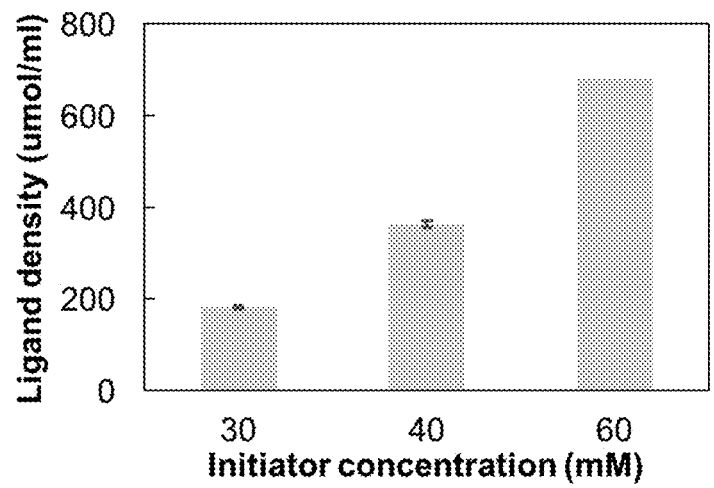
FIG. 4 presents the impact of initiator concentration on ligand density.

Ligand density increased with time and reached 340 μmol/ml at full conversion. FIG. 3C shows that quaternization of the tertiary amine groups was quantitative. FIG. 4 shows how initiator concentration can be used to increase ligand density up to 680 μmol/ml.

To form separation columns, two layers of membranes (each layer 160 μm in thickness), were packed into a plastic prototype mini housings with membrane volume of 15 uL.

Key performance measures of membrane columns were determined, including static binding capacity (SBC), and dynamic binding capacity at 10% breakthrough (DBC10%), over a commercially relevant range of conductivities. The proteins studied were bovine serum IgG, γ-globulin, and BSA. These represent a range of molecular weights (156, 120, 67 kDa) and isoelectric points (pI 6.5-7.5, 7.2, 4.7). γ-globulin and BSA served as model protein impurities. While the primary application of the columns is expected to be impurity removal, IgG was selected as a model antibody to test the feasibility for using the column for capture step purification. Salmon sperm DNA (ssDNA) served as the model for DNA impurities.

Figure 5A:
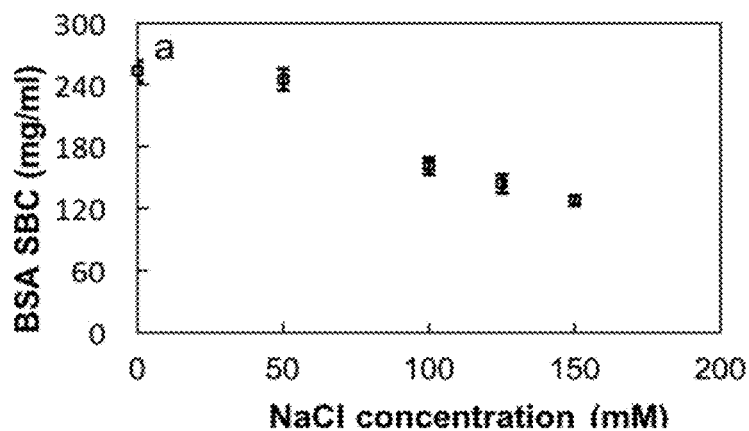
FIG. 5A presents the impact of sodium chloride concentration (i.e., ionic strength) on bovine serum albumin (BSA) static binding capacity (SBC) on a membrane as disclosed herein.

SBCs were measured by mass balance using initial and equilibrium solution concentrations measured by spectrophotometry. Solution conductivity (0-15 mS/cm) was varied. The data were generated from membranes prepared as described above with ligand density estimated to be 340 μmol/ml. FIG. 5A presents SBC measurements for BSA in 20 mM Tris-base buffer at pH=8.0. NaCl concentration was varied from 0 to 150 mM. The highest concentration is representative of conductivities in a typical Protein A elution pool.

FIG. 5A shows that the membrane had a very high binding capacity of 250 mg/mL at low solution conductivity. Although the capacity decreased with increasing conductivity, it still remained very high (144±9 mg/mL) at 125 mM NaCl. The 20 mM Tris-base buffer with 125 mM NaCl has conductivity of 13 mS/cm.

Figure 5B:
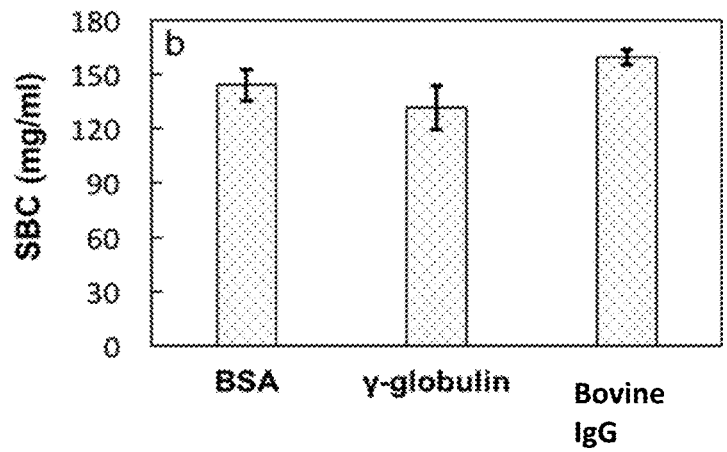
FIG. 5B presents the SBC of different proteins on a membrane as disclosed herein.

FIG. 5B compares SBC of different proteins. In this set of experiments, loading solution pH was 9.0, because both γ-globulin and bovine IgG have higher isoelectric points than BSA. Under this condition, these molecules were negatively charged and were bound to the positively charged membranes. The membranes had high binding capacity for all three protein molecules. Particularly noteworthy, IgG was bound by the membrane at pH 9, which proves the feasibility of using the columns for capture step purification of biologics that have high pI and cannot be purified by Protein A chromatography.

Capture step purification requires elution. Therefore, membranes were tested in 1 M NaCl buffer and no uptake was seen, suggesting that a simple salt solution could be an effective eluent. Overall, the membranes prepared using this technology maintained reversible, high binding capacity over a range of buffer conditions.

$DBC_{10\%}$ represents the mass bound per unit volume of membrane bed when the sorptive concentration in the effluent from the membrane bed reaches 10% of the feed. Membranes were packed into a plastic prototype mini column (membrane volume=15 µL) to measure $DBC_{10\%}$ values. The tests were conducted using an AKTA Prime Plus chromatography system. A range of flow rates (12-44 CVs/min, corresponding to residence times of 5 s to 1.4 s) was used to study the effects of throughput on $DBC_{10\%}$ and pressure drop.

Figure 6A:
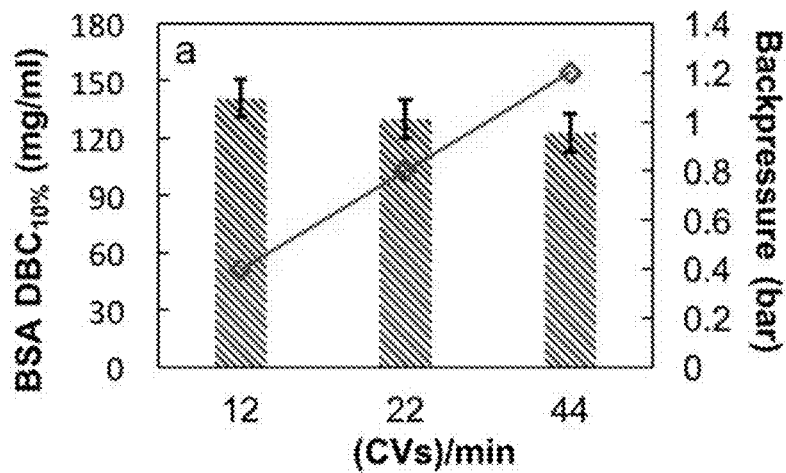
FIG. 6A presents the BSA dynamic binding capacity at 10% breakthrough (DBC10%) and backpressure changes (160 μm thick membrane) with flow rate for a system as described herein.

FIG. 6A shows that BSA $DBC_{10\%}$ of the column does not change with flow rate significantly. The error bars represent the standard deviation from the average of capacity measurements of three columns prepared using membranes synthesized in the same batch. Furthermore, the measured DBC was about 86% of the SBC at 1.4 s residence time. This demonstrates that the binding sites of the membrane are highly accessible, and the high ligand density does not create significant steric hindrance for uptake of protein molecules. FIG. 6A also shows the backpressure change with flow rate (symbols).

Figure 6B:
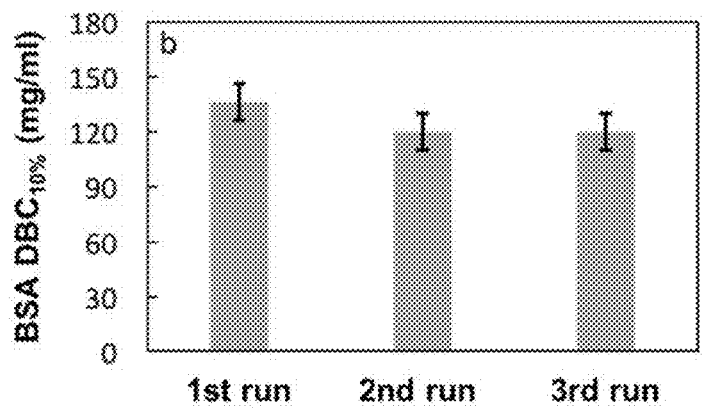
FIG. 6B presents the BSA DBC10% over three cycles.

FIG. 6B shows the column maintained binding capacity after three cycles (flow rate=22 CVs/min). In this set of bind-and-elute experiments, 1 M NaCl solution was used to elute bound molecules to regenerate the column. Although the multi-modal ligand offered robust binding over a range of pH and conductivities, the binding is reversible, unlike some anion exchange membranes based on primary amines.

Figure 6C:
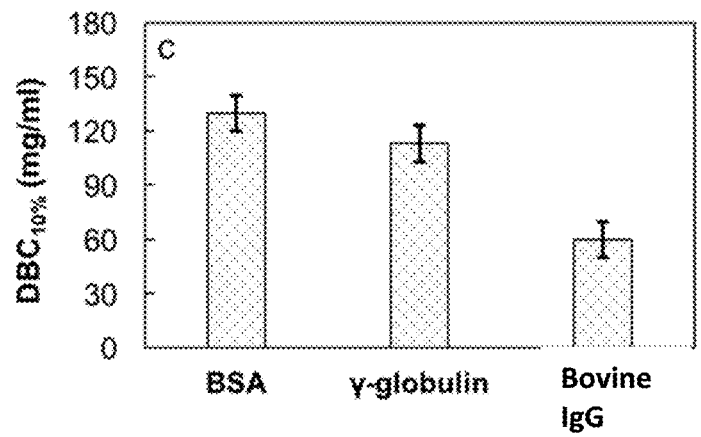
FIG. 6C presents the DBC10% of different protein molecules. 3 mg/ml protein in 20 mM Tris-base buffer with pH=8.0 and 125 mM NaCl was used as feed stream in all of FIG. 6A, FIG. 6B, and FIG. 6C measurements.

FIG. 6C shows that the membrane columns have high $DBC_{10\%}$ for different protein molecules. While $DBC_{10\%}$ was lower for bovine IgG than BSA or γ-globulin, IgG $DBC_{10\%}$ at 13 mS/cm and 22 CV/min (2.7 s residence time) was still about 60 mg/mL.

Figure 7A:
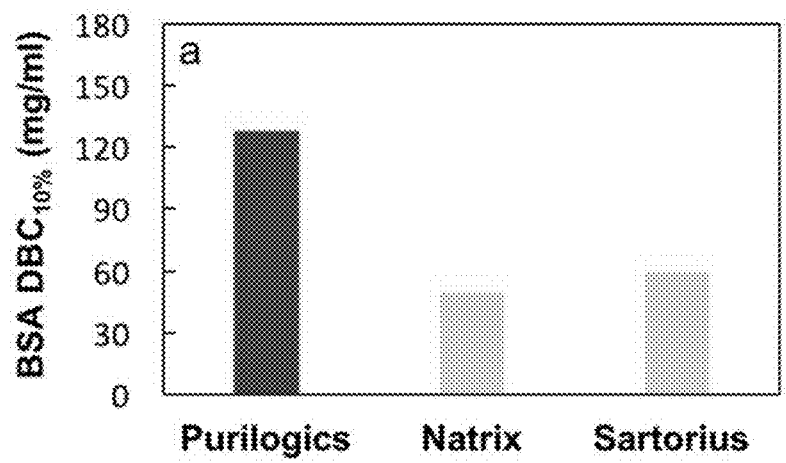
FIG. 7A compares BSA DBC10% in 20 mM Tris-base buffer (pH=8.0, NaCl=125 mM) for disclosed and comparison materials.

In FIG. 7, the binding capacity of disclosed membranes was compared to commercial products, including Natrix® FI HDQ and Sartorius® STIC products. Under conditions of 20 mM Tris-base and 125 mM NaCl (conductivity of 13 mS/cm) at pH=8.0, the disclosed membrane offered more than twice the BSA $DBC_{10\%}$ of the two commercial products. The recommended flow rate for Natrix® FI HDQ membrane is 10 CVs/min. The column incorporating the disclosed membrane was operated at 22 CVs/min. Thus, in addition to a nearly three times higher BSA $DBC_{10\%}$ relative to the commercial product, the disclosed membrane column operated much faster.

Figure 7B:
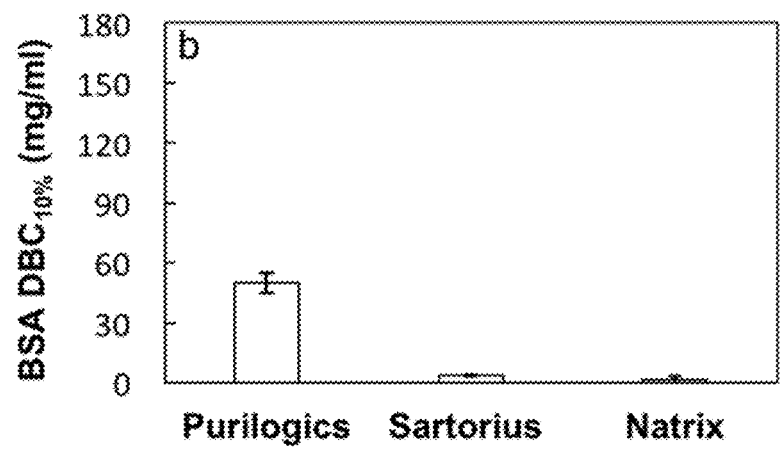
FIG. 7B compares BSA DBC10% in 1×PBS for disclosed and comparison materials.

The high binding capacity of a disclosed membrane was also demonstrated using 1× Phosphate Buffered Saline (1×PBS, pH=7.0) as buffer. 1×PBS is used quite commonly to store biologics and contains about 12 mM phosphate ions and 150 mM total ionic strength. Due to hydrogen bonding between phosphate salts and primary amines, the Sartorius® STIC membrane lost its capacity (FIG. 7B). The Natrix® FI HDQ membrane had BSA $DBC_{10\%}$ of 1.8 mg/mL in 1×PBS buffer. The BSA $DBC_{10\%}$ of the disclosed membrane was lower in PBS than Tris-base, but it still maintained satisfactory binding capacity that was 14 and 30 times higher than those of the commercial membranes.

Figure 8:
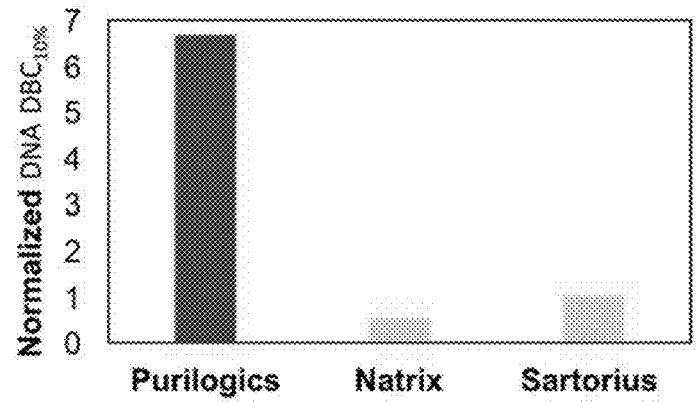
FIG. 8 compares DNA DBC10% for disclosed and comparison materials.

DNA capacity measurements were done with ssDNA at 0.1 mg/ml in 20 mM Tris-base with 125 mM NaCl and pH 8. ssDNA SBC was 20 mg/mL and $DBC_{10\%}$ was 5.4 mg/mL for disclosed membranes under these conditions. FIG. 8 compares the relative ssDNA $DBC_{10\%}$ of a disclosed membrane against the two commercial membrane products. As shown, the disclosed membrane had 6 times and 13 times higher ssDNA $DBC_{10\%}$ than the commercial products.

While certain embodiments of the disclosed subject matter have been described using specific terms, such description is for illustrative purposes only, and it is to be understood that changes and variations may be made without departing from the spirit or scope of the subject matter.

What is claimed is:

1. A multi-modal ion exchange membrane comprising:
   a porous membrane substrate;
   a plurality of polymers grafted at a surface of the porous membrane substrate; and
   a plurality of ligands bonded to and pendant from each of the grafted polymers, each of the ligands that is bonded to and pendant from each grafted polymer providing first and second modes of sorptive functionality, the first mode of sorptive functionality being an ionic fixed charge at a binding site linking the ligand with the grafted polymer to which it is bonded to and pendant from, the second mode of sorptive functionality being a component of the ligand that is bonded to and pendant from the grafted polymer.

2. The multi-modal ion exchange membrane of claim 1, wherein the first mode of sorptive functionality is cationic.

3. The multi-modal ion exchange membrane of claim 1, wherein the second mode of sorptive functionality comprises hydrophobic functionality, hydrophilic functionality, thiophilic functionality, hydrogen bond donating functionality, hydrogen bond accepting functionality, pi-pi bond donating functionality, pi-pi bond accepting functionality, metal chelating functionality, or a combination thereof.

4. The multi-modal ion exchange membrane of claim 1, wherein the porous membrane substrate comprises interconnected pores, the pores having an absolute pore size of about 0.1 micrometers or greater.

5. The multi-modal ion exchange membrane of claim 1, the polymer comprising polymerized dimethylaminoethyl methacrylate monomer, (diethylamino) ethyl methacrylate monomer, (dimethylamino) ethyl acrylate monomer, (diisopropylamino) ethyl methacrylate monomer, hydroxyethyl acrylate monomer, hydroxyethyl methacrylate monomer, poly (ethylene glycol) methacrylate monomer, or combinations thereof.

6. The multi-modal ion exchange membrane of claim 1, wherein prior to bonding with the grafted polymer and thereby becoming bonded to and pendant from the grafted polymer, each of the ligands have the following structure:

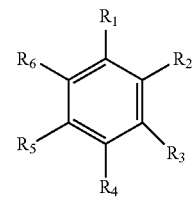

in which
$R_1$ is selected from halogen, hydroxyl, amine, C1 to C6 alkyl, alkyl halide, alkoxy, alcohol, carboxylic acid, sulfonic acid, phosphonic acid, amine, or combinations thereof; and
$R_2$ through $R_6$ are independently selected from hydrogen, halogen, hydroxyl, amine, C1 to C6 alkyl, alkyl halide, alkoxy, alcohol, carboxylic acid, sulfonic acid, phosphonic acid, amine, or combinations thereof; and wherein one or more of $R_2$ through $R_6$ are optionally substituted with a conjugated and/or non-conjugated ring.

7. The multi-modal ion exchange membrane of claim 1, the membrane incorporating the ligands at a ligand density of from about 50 μM/ml to about 1000 μM/ml.

8. The multi-modal ion exchange membrane of claim 1, further comprising one or more additional modes of sorptive functionality.

9. The multi-modal ion exchange membrane of claim 6, wherein the conjugated and/or non-conjugated ring comprises a heterocyclic ring or a fused ring system.

10. The multi-modal ion exchange membrane of claim 6, wherein the conjugated and/or non-conjugated ring is derivatized with one or more of hydrogen, halogen, or alkoxy.

11. A method for forming the multi-modal ion exchange membrane of claim 1, the method comprising:
grafting the plurality of polymers at the surface of the porous membrane substrate, and
covalently binding the plurality of ligands to each of the polymers such that each of the plurality of ligands is bonded to and pendant from a polymer.

12. The method of claim 11, wherein the plurality of polymers is grafted at the surface of the porous membrane substrate according to a grafting from process, the grafting from process comprising anchoring an initiator molecule to the surface of the porous membrane substrate and activating the initiator molecule in the presence of a monomer.

13. The method of claim 12, wherein the grafting from process comprises an atom transfer radical polymerization process.

14. A method for separating a targeted species from a solution, the method comprising contacting the multi-modal ion exchange membrane of claim 1 with a solution, the solution comprising one or more targeted species, the solution having a solution conductivity of from about 0.5 millisiemans per centimeter to about 50 millisiemans per centimeter.

15. The method of claim 14, wherein the targeted species is a proteinaceous species, the multi-modal membrane exhibiting a dynamic binding capacity for the proteinaceous species of from about 10 milligrams per milliliter to about 250 milligrams per milliliter.

16. The method of claim 14, wherein the targeted species is a polynucleotide, the multi-modal ion exchange membrane exhibiting a dynamic binding capacity for the polynucleotide of from about 1 milligram per milliliter to about 50 milligrams per milliliter.

17. The method of claim 14, wherein the solution passes through a column at a rate of about 10 column volumes per minute or greater.

18. The method of claim 14, wherein the solution has a solution conductivity of from about 8 millisiemans per centimeter to about 30 millisiemans per centimeter.

19. The method of claim 14, the targeted species comprising proteinaceous targets, polynucleotide targets, endotoxins, virus particles, virus-like particles, aggregates, isoforms of biological compounds, or a combination thereof.

* * * * *